United States Patent [19]

Limina et al.

[11] Patent Number: 5,507,901

[45] Date of Patent: Apr. 16, 1996

[54] METHOD OF MANUFACTURING INTEGRATED LABELS

[75] Inventors: Anthony M. Limina, Amherst; Paul M. Cummings, Grand Island, both of N.Y.

[73] Assignee: Moore Business Forms, Inc.

[21] Appl. No.: 361,523

[22] Filed: Dec. 22, 1994

[51] Int. Cl.⁶ .................................................. B32B 31/12
[52] U.S. Cl. .......................... 156/200; 156/204; 156/227; 156/267; 156/269; 156/272.2; 156/277; 40/638; 428/42; 428/40; 428/352
[58] Field of Search .................................. 156/227, 200, 156/204, 289, 249, 226, 269, 267, 272.2, 277; 40/638; 428/40, 42, 352

[56] References Cited

U.S. PATENT DOCUMENTS

| | | |
|---|---|---|
| 3,006,800 | 10/1961 | Lasker et al. . |
| 3,312,005 | 4/1967 | McElroy ................................. 40/638 |
| 3,956,049 | 5/1976 | Johnsen .................................. 156/227 |
| 4,158,587 | 6/1979 | Keller et al. . |
| 4,425,176 | 1/1984 | Shibano et al. . |
| 4,664,416 | 5/1987 | Steidinger . |
| 4,948,450 | 8/1990 | Hurter et al. . |
| 4,986,868 | 1/1991 | Schmidt . |
| 5,129,682 | 7/1992 | Ashby .................................... 283/81 |
| 5,219,183 | 6/1993 | McKillip . |
| 5,234,517 | 8/1993 | Pape et al. . |
| 5,254,381 | 10/1993 | Hoffmann et al. . |
| 5,279,690 | 1/1994 | Hess, Jr. et al. .................... 156/227 |
| 5,284,689 | 2/1994 | Laurash et al. . |
| 5,292,713 | 3/1994 | Stenzel et al. ........................ 428/40 |
| 5,318,326 | 6/1994 | Garrison ................................ 156/227 |
| 5,407,718 | 4/1995 | Popal et al. ........................... 428/42 |

Primary Examiner—Michele K. Yoder
Attorney, Agent, or Firm—Nixon & Vanderhye

[57] ABSTRACT

Labels with release liners, including integrated labels, are manufactured in a simple manner that does not require two webs of material. A pressure sensitive adhesive is applied (e.g. patterned coated) in a first strip on a second face of a web of label material (e.g. bond paper). Then silicone release material is applied in a second strip on the second face of the web of label material so that the second strip is adjacent, but spaced from, the first strip and substantially parallel to it, a line of demarcation (about 1–25 mm wide) provided between the first and second strips, and each strip is at least about one inch wide. Then the label material is folded (e.g. plow folded while on a Webtron press) about the line of demarcation so that the first and second strips come into face-to-face contact with each other. Then individual labels are formed from the label material by die cutting and/or slitting, each label having a first ply with a first printable face corresponding to the first face of the web from which it is ultimately formed, and a second pressure sensitive adhesive covered face corresponding to the second face of the web from which it is ultimately formed, and a second ply with a first face corresponding to the first face of the web from which it is ultimately formed and a second release material covered face corresponding to the second face of the web from which it is ultimately formed, the second faces of the plies in face-to-face engagement with each other. When integrated labels are manufactured, the matrix material is removed after die cutting.

21 Claims, 3 Drawing Sheets

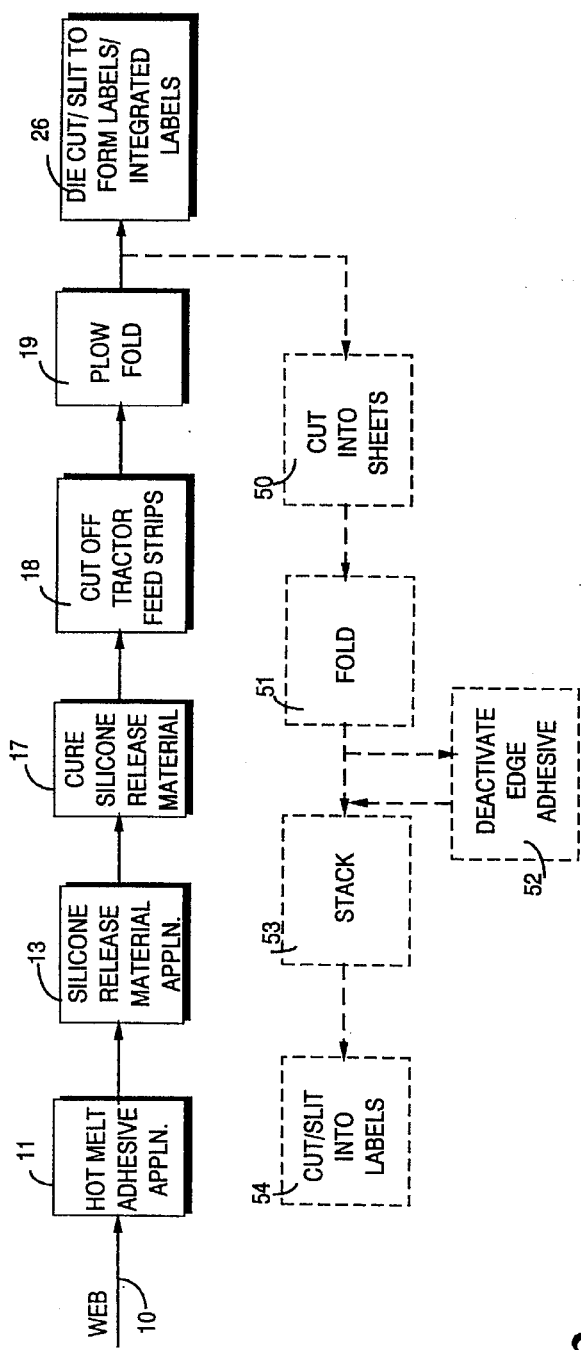
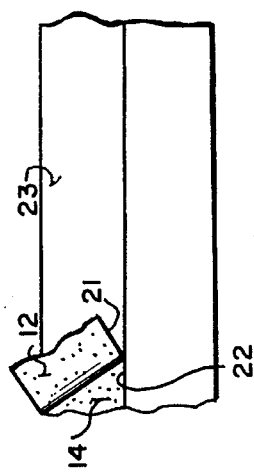
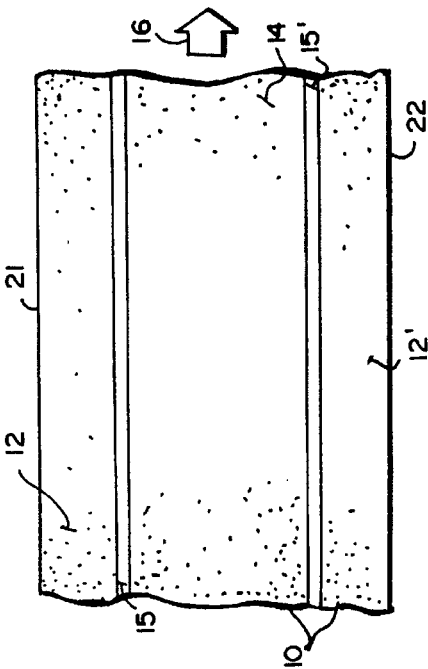

*Fig. 4*
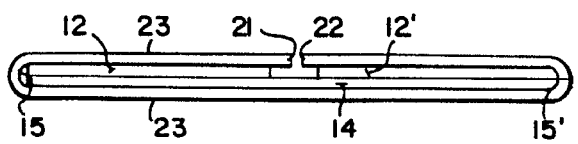
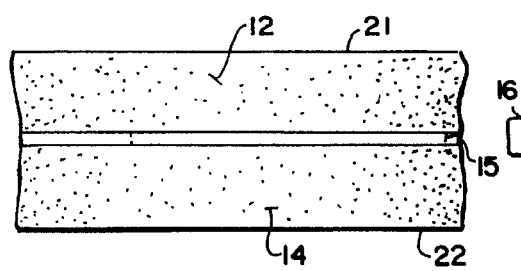
*Fig. 5*
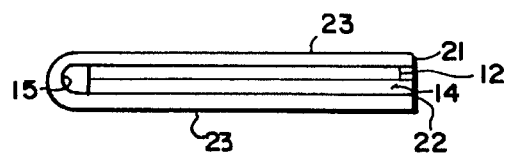
*Fig. 6*
*Fig. 7*
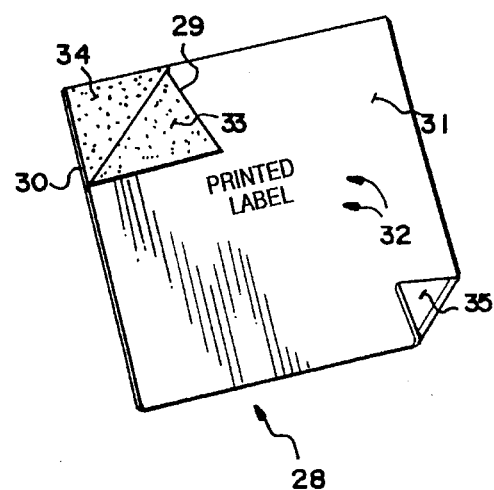

METHOD OF MANUFACTURING INTEGRATED LABELS

BACKGROUND AND SUMMARY OF THE INVENTION

In the manufacture of pressure sensitive adhesive labels, typically a liner sheet and a paper sheet are merged together during construction, and then are die cut, or otherwise formed into labels. The adhesive is usually applied to a liner sheet of silicone release material or the like, and then transfers to the paper sheet after the sheets are merged. Various forms of this basic technique are used to produce all sorts of labels, including products known as "integrated labels", and shown in U.S. Pat. No. 5,129,682 (the disclosure of which is hereby incorporated by reference herein).

According to the present invention, a method of manufacturing labels of a wide variety of types, including integrated labels, is provided which is simpler than prior art techniques, and also requires the utilization of only a single web of paper to construct the labels. The method of the invention is particularly simple and straight forward for the manufacture of integrated labels. While the technique described in U.S. Pat. No. 5,129,682 in which transfer tape is used to form the integrated label is widely accepted commercially, a separate supply of transfer tape, or web of silicone release material which is coated to produce transfer tape, is required. The method of the invention provides a more efficient in-line method of making integrated labels and does away with the separate web, only one web being necessary. Thus the invention results in a cost saving and a time savings compared to the process in U.S. Pat. No. 5,129,682. Similar advantages are also present compared to other techniques for making other types of labels.

The invention also relates to a unique intermediate for making labels, including integrated labels. The intermediate according to the invention has a unique construction, and facilitates the ready, efficient, and simple manufacture of labels, including integrated labels.

According to one aspect of the present a method of making a label having a first ply with a first printable face and a second pressure sensitive adhesive covered face, and a second ply with a first face and a second release material covered face, the second faces of the plies in face-to-face engagement with each other, using a web of label material having first and second faces, is provided. The method comprises the following steps: (a) Applying pressure sensitive adhesive in a first strip on the second face of the web of label material. (b) Applying release material in a second strip on the second face of the web of label material so that the second strip is adjacent, but spaced from, the first strip and substantially parallel thereto, a line of demarcation provided between the first and second strips. After steps (a) and (b): (c) folding the label material about the line of demarcation so that the first and second strips come into face-to-face contact with each other; and (d) acting on the label material from step (c) so that individual labels are formed from the label material, each label having a first ply with a first printable face corresponding to the first face of the web from which it is ultimately formed, and a second pressure sensitive adhesive covered face corresponding to the second face of the web from which it is ultimately formed, and a second ply with a first face corresponding to the first face of the web from which it is ultimately formed and a second release material covered face corresponding to the second face of the web from which it is ultimately formed, the second faces of the plies in face-to-face engagement with each other.

Step (a) is typically practiced by applying hot melt adhesive with an extrusion die. The hot melt adhesive may be rendered detacky when directly exposed to a sufficient does of electromagnetic radiation (e.g. ultraviolet light), as more fully described in copending application Ser. No. 08/368,963 filed Jan. 5, 1995.

Step (b) is typically practiced by pattern coating a silicone release material, such as an ultraviolet light (UV) curable, or Electron Beam (E) curable, silicone release material, and curing takes place before step (c). The line of demarcation typically is at least about 1 mm in width, preferably about 1–25 mm. If UV curing of the silicone release material is practiced the adhesive is applied after the curing so as not to expose the adhesive to UV radiation.

Step (c) may be practiced by plow folding while the label material is in web form, and as it moves continuously in a given direction. Alternatively, the web may be cut into sheets, and plow folded before or after cut into sheets, and optionally otherwise folded.

Step (d) is typically practiced by die cutting, slitting, or both die cutting and slitting. Slitting takes place along the line of demarcation, typically after folding, and die cutting actually cuts the labels from the folded-over web, and the matrix material can be removed after die cutting as shown per se in U.S. Pat. No. 5,129,682. Die cutting and slitting also preferably take place while the web is moving.

During the practice of all of steps (a)–(d) the web can be continuously moving in a first direction. All of these method steps can be practiced on a Webtron press, using conventional cutting cylinders, plow folders, extrusion dies, and the like to perform the various operations. Conventional pattern coating, or other extrusion application, equipment is precise enough to provide a line of demarcation, and the width of the line may vary about 1 mm without any adverse affect, therefore no special efforts need be made to insure a line of demarcation. When the web includes tractor feed strips, the method comprises the further step (e) of cutting off the tractor feed strips before practicing step (c). While the method can be used to produce a wide variety of labels, it is particularly useful for producing integrated labels.

The method may also comprise the further step (e) of applying (e.g. pattern coating) a third strip of pressure sensitive adhesive on the web second face on the opposite side of the second strip from the first strip to provide a second line of demarcation between the second and third strip—in which case step (c) is also practiced to fold the label material about the second line of demarcation so that opposite edges of label material will be adjacent and parallel to each other after step (c).

According to another aspect of the present invention, a unique intermediate for a label is also provided. The intermediate includes: A web of paper having first and second faces and first and second side edges. A strip of pressure sensitive adhesive on the second face and adjacent the first edge, having a first width (typically at least wide enough to provide the adhesive backing for a conventional full size label, e.g. at least about one inch); and a strip of silicone release material on the second face and adjacent and parallel to the strip of pressure sensitive adhesive (and also at least about one inch wide) and separated from the pressure sensitive adhesive material strip by a line of demarcation about 1–25 mm wide. The strip of silicone release material may also have substantially the first width, and it may be adjacent the second edge of the web, or spaced at least three inches from the second edge of the web.

It is the primary object of the present invention to provide a simple and efficient method of producing labels, particularly integrated labels, and a unique intermediate therefor. This and other objects of the invention will become clear from an inspection of the detailed description of the invention, and from the appended claims.

BRIEF DESCRIPTION OF THE DRAWINGS

FIG. 1 is a block diagram illustrating various method steps that can be practiced according the exemplary methods of the present invention;

FIG. 2 is a schematic top plan view of one form of a label intermediate according to the invention;

FIG. 3 is a is a schematic top plan view of the intermediate of FIG. 2 after folding;

FIG. 4 is an end view of the intermediate of FIG. 3;

FIG. 5 is a view like that of FIG. 2 for another embodiment of label intermediate according to the invention;

FIG. 6 is a view like that of FIG. 4 for the intermediate of FIG. 5, after folding;

FIG. 7 is a to perspective view of an exemplary label that can be die cut from the intermediates of FIGS. 4 or 6;

DETAILED DESCRIPTION OF THE DRAWINGS

Figure 8:
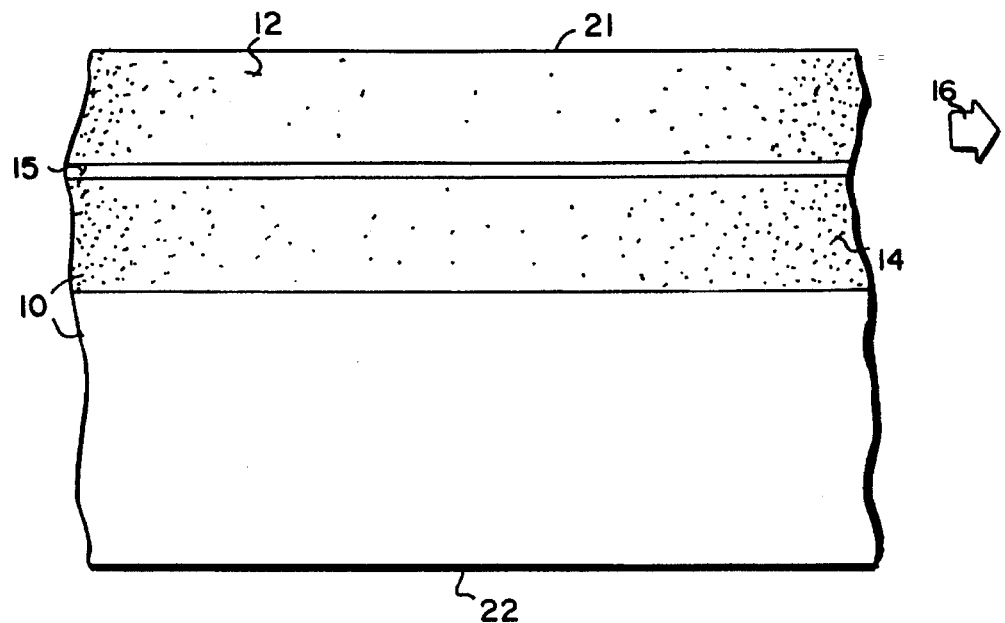
FIG. 8 is a view like that of FIG. 2 for an integrated label intermediate according to the invention.

According to the present invention, a method is providing for acting on a web 10 (FIGS. 1, 2, 5, 8, 9) to produce labels, including integrated labels, in a simple, low cost, and effective manner. Two alternatives are illustrated in FIG. 1, one in solid line, and another in dotted line. The web 10 according to the invention preferably comprises a web of bond paper of any desired weight depending upon the particular labels to be constructed, e.g. a weight of about 20–28 lbs. per 1000 sheet ream (17"×22" sheets).

The web is typically acted upon on a Webtron press having conventional extrusion die, cutting, folding, and like attachments, and for the solid line embodiment of FIG. 1 the method is practiced while the web is continuously moving in a given direction (16 in FIG. 2). The first method step, indicated by box 11, may be preferably application of a hot melt, or like pressure sensitive adhesive, e.g. with a hot melt extrusion die. A wide variety of conventional pressure sensitive adhesives are suitable, such as available from Swift Adhesives of Downers Grove, Ill., or Ecomelt Adhesives of Paramount, Calif. The adhesive may be of the type such as described in copending application Ser. No. 08/368,963 filed Jan. 1, 1995 which will be rendered detackified if directly exposed to a sufficient dosage of electromagnetic radiation (typically UV radiation). A pattern coat, or like application, of adhesive is applied, as illustrated at 12 in FIGS. 2–6 and 8 typically adjacent one side edge (21) of the web 10.

The next step may be the application of a release material to the same face of the web as the adhesive, e.g. pattern coating of a silicone release material as indicated by box 13. The strip of release material applied at box 13 is illustrated at 14 in FIGS. 2–6, 8, and 9, and is applied using a conventional flexo unit. For example the silicone may be E or UV curable, such as UV 9300 or 9305 using photoinitiator 9365 and available from General Electric, or a like release material available from Goldschmidt. Pattern coating of the strip 14 is sequential and in-line with pattern coating of the strip 12. The adhesive may be applied first, however where step 17 is a UV curing stage, and under some other circumstances, the adhesive is applied second (after curing of the silicone release material strip 14) in order not to expose the adhesive to the UV radiation in stage 17.

A line of demarcation 15—see FIGS. 2, 4–6, and 8—is provided between the strips 12, 14. The line of demarcation should usually have a width (the direction perpendicular to the direction of conveyance 16) of about 1–25 mm, although the exact width is not critical. Tolerances of about 1 mm can easily be achieved using conventional extrusion dies and flexo units on Webtron presses. After application of the strip 14, the release material is cured as indicated at box 17 in FIG. 1, e.g. using conventional electron beam or ultraviolet curing devices. After curing, the tractor strips (if present—not shown in FIGS. 2, etc., for clarity of illustration) for the web 10 are cut off using conventional slitters, and according to the solid line embodiment of FIG. 1 folding is accomplished by plow folding as indicated at box 19, while the web 10 is moving in direction 16.

A wide variety of different configurations of the strips 12, 14 may be applied depending upon the processing techniques used, the labels to be produced, etc. In all embodiments, however, it is preferred that the width of the strips 12, 14 be at least as wide as a conventional full size label (e.g. a mailing or pharmacy label), typically having a width of at least about one inch.

In the FIGS. 2–4 embodiment, the strip 14 is about twice as wide (the dimension perpendicular to the direction of conveyance 16 of the web 10) as the strip 12, and a second adhesive strip 12' is provided adjacent side edge 22 of web 10, opposite edge 21, with a line of demarcation 15' between the strips 12', 14. In this embodiment after plow folding, the bottom face 23 of the web 10 overlays the face having the strips 12, 12', 14 thereon, the strips 12, 12' at the opposite side edges 21, 22 being plow folded over sequentially, to produce the intermediate of FIGS. 3 and 4 from that of FIG. 2. As seen in FIGS. 3 and 4, the edges 21, 22 are then adjacent each other.

In the FIGS. 5 and 6 embodiment, the width of release material strip 14 is substantially the same as the width of strip 12 and adjacent edge 22, so that edges 21, 22 are aligned after the plow folding step 19 (see FIG. 6).

Figure 9:
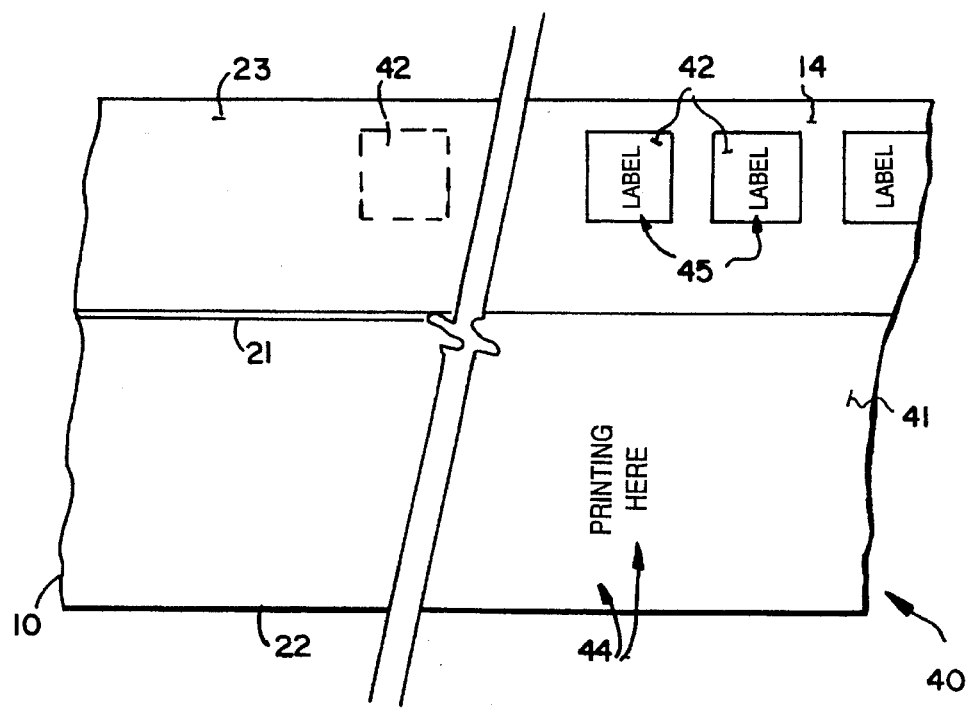
FIG. 9 is a top plan view showing on the left side thereof the intermediate of FIG. 8 after folding over of the adhesive strip portion of the web, and showing on the right side thereof a final integrated label after die cutting of the left side intermediate.

In the FIGS. 8 and 9 embodiment, integrated labels are produced. In this embodiment the strip 14 is widely spaced from side edge 22 (e.g. at least about three inches), and the strips 12, 14 are of substantially the same width, so that the edge 21 overlaps the inner edge of strip 14 after the plow folding step 19 (as seen in FIG. 9).

Labels are formed by die cutting, slitting, or both, the intermediate of FIGS. 3, 4, 6, or 9, as indicated schematically for box/step 26 in FIG. 1. One conventional type of label 28 that can be produced from the intermediates of either FIGS. 4 or 6 is illustrated in FIG. 7. Label 28 includes a first ply 29 with a first printable face 31 (e.g. having printing 32 thereon) and a second pressure sensitive adhesive covered face 33; and a second ply 30 with a first face 35 and a second release material covered face 36, the second faces 33, 36 of the plies 29, 30 in face-to-face engagement with each other (until separated when the label is ready to be applied to a surface or element). The face 35 is also printable, typically being of bond paper—for example it may have a trademark, directions for use, or design thereon (not shown). The label 28 may be made simply by die cutting from the overlapping portions of the web 10 containing the strips 12, 14 or 12', 14, or by slitting the demarcation line/edge 15 only (in the FIG. 6 embodiment), or by both slitting the lines/edges 15, 15' and die cutting or slitting at the interface of edges 21, 22, and by making other slits or die cuts perpendicular to the direction 16 for the FIG. 4 embodiment.

FIG. 9 shows construction of an integrated label 40, such as shown in U.S. Pat. No. 5,129,682. The integrated label 40 includes a large bond paper face/portion 41, and individual labels 42 which have been die cut from the portions of the web 10 with strips 12, 14 which were overlapping. Printing 44 may be provided (e.g. by a station on the Webtron press) on paper portion 41, and printing 45 on label 42. The right had portion of FIG. 9 shows the matrix material removed after die cutting of the labels 42 from the bent-over portion of web 10 having the strip 12 thereon, and after slitting along the line of demarcation 15; that is what is illustrated at the right of FIG. 9 is essentially the same as what is illustrated in FIG. 3 of U.S. Pat. No. 5,129,682. During the practice of step 26, the labels or integrated labels are also cut into their desired lengths.

FIG. 1 also schematically shows another embodiment of method that may be practiced according to the present invention. In the alternative embodiment—shown in dotted line in FIG. 1—the web 10 is cut into sheets after plow folding, as indicated at box 50. The cut sheets are folded about the line or lines of demarcation 15, or 15 and 15', or alternatively (i.e. to plow folding at 19) or additionally by using conventional sheet folding equipment 51 may optionally be used. If it is necessary or desirable to deactivate the adhesive at edge portions between the adhesive and silicone strip interfaces then step 52—shown in copending application Ser. No. 08/368,963 filed Jan. 5, 1995—may be practiced e.g. exposure of the adhesive which overlaps directly to UV light). The folded sheets may be stacked prior to or after step 52, as shown by box 53, using a conventional stacker, and the labels die cut and/or slit from the folded sheets, as indicated by box 54 in FIG. 1.

It will thus be seen that according to the present invention a simple yet effective method is provided for the manufacture of labels with a release liner which does not require two different webs to be combined, and which is particularly simple and straightforward for use in the manufacture of integrated labels, and produces a unique label intermediate.

While the invention has been described in connection with what is presently considered to be the most practical and preferred embodiment, it is to be understood that the invention is not to be limited to the disclosed embodiment, but on the contrary, is intended to cover various modifications and equivalent arrangements and methods included within the spirit and scope of the appended claims.

What is claimed is:

1. A method of making a label having a first ply with a first printable face and a second pressure sensitive adhesive covered face, and a second ply with a first face and a second release material covered face, the second faces of the plies in face-to-face engagement with each other, using a web of label material having first and second faces, comprising the steps of:

(a) applying pressure sensitive adhesive in a first strip on the second face of the web of label material;

(b) applying release material in a second strip on the second face of the web of label material so that the second strip is adjacent, but spaced from, the first strip and substantially parallel thereto, a line of demarcation provided between the first and second strips;

after steps (a) and (b):

(c) folding the label material about the line of demarcation so that the first and second strips come into face-to-face contact with each other; and (d) acting on the label material from step (c) so that individual labels are formed from the label material, each label having a first ply with a first printable face corresponding to the first face of the web from which it is ultimately formed, and a second pressure sensitive adhesive covered face corresponding to the second face of the web from which it is ultimately formed, and a second ply with a first face corresponding to the first face of the web from which it is ultimately formed and a second release material covered face corresponding to the second face of the web from which it is ultimately formed, the second faces of the plies in face-to-face engagement with each other.

2. A method as recited in claim 1 wherein step (b) is practiced before step (a).

3. A method as recited in claim 1 wherein step (b) comprises the step of pattern coating a silicone release material on the second face of the web; and comprising the further step (e), between steps (b) and (c), of curing the silicone release material.

4. A method as recited in claim 3 wherein step (b) is practiced by pattern coating an ultraviolet or electron beam curable silicone release material onto the web second face; and wherein step (e) is practiced by applying an ultraviolet light, or electron beam, respectively, to the web second face to cure the silicone release material.

5. A method as recited in claim 1 wherein step (c) is practiced by plow folding the material while it is being continuously conveyed in web form.

6. A method as recited in claim 5 wherein step (d) is practiced by die cutting or slitting or both die cutting and slitting.

7. A method as recited in claim 1 comprising the further step of cutting the web into sheets between steps (c) and (d).

8. A method as recited in claim 1 wherein step (a) is practiced by pattern coating a hot melt adhesive using an extrusion die.

9. A method as recited in claim 1 wherein step (d) is practiced by die cutting while the label material is in web form.

10. A method as recited in claim 1 wherein step (d) is practiced by die cutting or slitting or both die cutting and slitting.

11. A method as recited in claim 1 comprising the further step (e) of applying a third strip of pressure sensitive adhesive on the web second face on the opposite side of the second strip from the first strip to provide a second line of demarcation between the second and third strips; and wherein step (c) is also practiced to fold the label material about the second line of demarcation so that opposite edges of label material will be adjacent and parallel to each other after step (c).

12. A method as recited in claim 11 wherein steps (a)–(e) are practiced on the web while continuously conveying the web in a first direction.

13. A method as recited in claim 1 wherein steps (a)–(d) are practiced on the web while continuously conveying the web in a first direction.

14. A method as recited in claim 13 wherein steps (a) and (b) are practiced to provide a line of demarcation at least about 1 mm wide, the width of the line of demarcation extending in a second direction perpendicular to the first direction.

15. A method as recited in claim 1 wherein steps (a) and (b) are practiced to provide a line of demarcation at least about 1 mm wide.

16. A method as recited in claim 5 wherein the web includes tractor feed strips, and comprising the further step (e) of cutting off the tractor feed strips before practicing step (c).

17. A method as recited in claim 4 wherein step (c) is practiced by plow folding the material while it is being continuously conveyed in web form.

18. A method as recited in claim 15 wherein step (c) is practiced by plow folding the material while it is being continuously conveyed in web form.

19. A method as recited in claim 1 wherein step (a) is practiced to pattern coat an adhesive that is rendered non-tacky by direct exposure to a sufficient dose of a given electromagnetic radiation; and comprising the further step, after step (c), of supplying a sufficient dose of a given electromagnetic radiation so as to render adhesive at an edge portion of the label material non-tacky.

20. A method as recited in claim 1 wherein steps (a)–(d) are practiced to produce an integrated label.

21. A method as recited in claim 1 wherein the web has a width much greater than the width of the first and second strips, and wherein the web is bond paper and includes printing thereon on the second face remote from the first and second strips.

* * * * *